(12) United States Patent
Tu et al.

(10) Patent No.: US 11,270,079 B2
(45) Date of Patent: Mar. 8, 2022

(54) TRANSLATION MODEL BASED TRAINING METHOD AND TRANSLATION METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhaopeng Tu, Shenzhen (CN); Xiang Kong, Shenzhen (CN); Shuming Shi, Shenzhen (CN); Tong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 223 days.

(21) Appl. No.: 16/686,083

(22) Filed: Nov. 15, 2019

(65) Prior Publication Data

US 2020/0081982 A1 Mar. 12, 2020

Related U.S. Application Data

(63) Continuation of application No. PCT/CN2018/120293, filed on Dec. 11, 2018.

(30) Foreign Application Priority Data

Dec. 15, 2017 (CN) .......................... 201711354563.0

(51) Int. Cl.
*G06F 40/30* (2020.01)
*G06N 3/04* (2006.01)
*G06N 3/08* (2006.01)

(52) U.S. Cl.
CPC ........... *G06F 40/30* (2020.01); *G06N 3/0454* (2013.01); *G06N 3/08* (2013.01)

(58) Field of Classification Search
CPC .............................. G06F 17/2785; G06N 3/08
See application file for complete search history.

(56) References Cited

U.S. PATENT DOCUMENTS

2012/0278060 A1* 11/2012 Cancedda ............... G10L 15/06
704/2
2013/0110491 A1 5/2013 He et al.
(Continued)

FOREIGN PATENT DOCUMENTS

| CN | 105183720 A | 12/2015 |
| CN | 105446958 A | 3/2016 |

(Continued)

OTHER PUBLICATIONS

The World Intellectual Property Organization (WIPO) International Search Report for PCT/CN2018/120293 dated Mar. 15, 2019 5 Pages (including translation).

(Continued)

*Primary Examiner* — Kevin Ky
(74) *Attorney, Agent, or Firm* — Anova Law Group, PLLC

(57) ABSTRACT

A translation model based training method is provided for a computer device. The method includes inputting a source sentence to a translation model, to obtain a target sentence outputted by the translation model; determining a fidelity of the target sentence to the source sentence; using the target sentence and a reference sentence as input of a discriminator model, using the fidelity as output of the discriminator model, and training the discriminator model on a performance of calculating a similarity between the target sentence and the reference sentence; outputting the similarity by using the discriminator model; and using the source sentence as input of the translation model, using the target sentence as output of the translation model, and using the similarity as a weight coefficient, and training the translation model on a (Continued)

performance of outputting the corresponding target sentence according to the input source sentence.

17 Claims, 10 Drawing Sheets

(56) References Cited

U.S. PATENT DOCUMENTS

| | | | | |
|---|---|---|---|---|
| 2013/0151235 A1* | 6/2013 | Och | ............ | G06F 40/237 |
| | | | | 704/9 |
| 2014/0067361 A1* | 3/2014 | Nikoulina | ............ | G06F 40/44 |
| | | | | 704/2 |
| 2017/0060854 A1* | 3/2017 | Zeng | ............ | G06F 40/55 |
| 2019/0188257 A1* | 6/2019 | Iida | ............ | G06F 16/00 |

FOREIGN PATENT DOCUMENTS

| | | |
|---|---|---|
| CN | 106484682 A | 3/2017 |
| CN | 107368475 A | 11/2017 |
| CN | 108304390 A | 7/2018 |

OTHER PUBLICATIONS

The State Intellectual Property Office of the People's Republic of China (SIPO) Office Action 1 for 201711354563.0 dated Jun. 20, 2019 7 Pages (including translation).
Lijun Wu et al., "Adversarial Neural Machine Translation", arXiv preprint arXiv:1704,06933v4. [cs.CL], Sep. 30, 2018 11 Pages.

* cited by examiner

TRANSLATION MODEL BASED TRAINING METHOD AND TRANSLATION METHOD, COMPUTER DEVICE, AND STORAGE MEDIUM

RELATED APPLICATIONS

This application is a continuation application of PCT Patent Application No. PCT/CN2018/120293, filed on Dec. 11, 2018, which claims priority to Chinese Patent Application No. 2017113545630, entitled "TRANSLATION MODEL BASED TRAINING METHOD AND TRANSLATION METHOD, COMPUTER DEVICE, AND STORAGE MEDIUM" filed with China National Intellectual Property Administration on Dec. 15, 2017, which is incorporated by reference in its entirety.

FIELD OF THE TECHNOLOGY

This application relates to machine translation (MT) technology and, particularly, to a translation-model based training method and translation method, a computer device, and a storage medium.

BACKGROUND

With the development of machine translation, neural machine translation (NMT) has been commonly applied as a new generation of translation technology. The neural network machine translation system is constructed based on an encoder-decoder framework. However, in the translation process of the neural network machine translation system, the decoder has multiple tasks, such as recording the current translated content, and the content that needs to be translated, and recording related information of the fluency of translation. Due to the complexity of the tasks of the decoder, the decoder often cannot balance all tasks. Consequently, the accuracy of translation of the current neural network machine translation system is not high, and the missed-translation and repeated-translation phenomena are severe.

The disclosed methods and systems are directed to solve one or more problems set forth above and other problems.

SUMMARY

According to various embodiments provided in the present disclosure, a translation-model based training method and translation method, a computer device, and a storage medium are provided.

An aspect of the present disclosure provides a translation model based training method for a computer device. The method includes inputting a source sentence to a translation model, to obtain a target sentence outputted by the translation model; determining a fidelity of the target sentence to the source sentence; using the target sentence and a reference sentence as input of a discriminator model, using the fidelity as output of the discriminator model, and training the discriminator model on a performance of calculating a similarity between the target sentence and the reference sentence; outputting the similarity between the target sentence and the reference sentence by using the discriminator model; and using the source sentence as input of the translation model, using the target sentence as output of the translation model, and using the similarity as a weight coefficient, and training the translation model on a performance of outputting the corresponding target sentence according to the input source sentence.

Another aspect of the present disclosure provides a translation model based translation method for a computer device. The method includes obtaining a translation model obtained through training in an adversarial network. The translation model is obtained through training in the adversarial network by using a source sentence as input of the translation model, by using a target sentence as output of the translation model, and by using a similarity between the target sentence and a reference model as a weight coefficient, and the similarity is calculated by using a discriminator model of the adversarial network. The method also includes inputting a to-be-translated sentence into the translation model obtained through training; calculating a semantic vector corresponding to the to-be-translated sentence by using the translation model obtained through training; and using the semantic vector as input of the translation model obtained through training, and outputting a translation result sentence corresponding to the to-be-translated sentence.

Another aspect of the present disclosure provides a computer device. The computer device includes a memory storing computer-readable instructions; and one or more processors coupled to the memory. When executing the computer-readable instructions, the one or more processors are configured to perform: inputting a source sentence to a translation model, to obtain a target sentence outputted by the translation model; determining fidelity of the target sentence to the source sentence; using the target sentence and a reference sentence as input of a discriminator model, using the fidelity as output of the discriminator model, and training the discriminator model on a performance of calculating a similarity between the target sentence and the reference sentence; outputting the similarity between the target sentence and the reference sentence by using the discriminator model; and using the source sentence as input of the translation model, using the target sentence as output of the translation model, and using the similarity as a weight coefficient, and training the translation model on a performance of outputting the corresponding target sentence according to the input source sentence.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly describes the accompanying drawings. Apparently, the accompanying drawings in the following description show merely some embodiments of the present disclosure, and a person of ordinary skill in the art may derive other drawings from these accompanying drawings without creative efforts.

DETAILED DESCRIPTION

Figure 1:
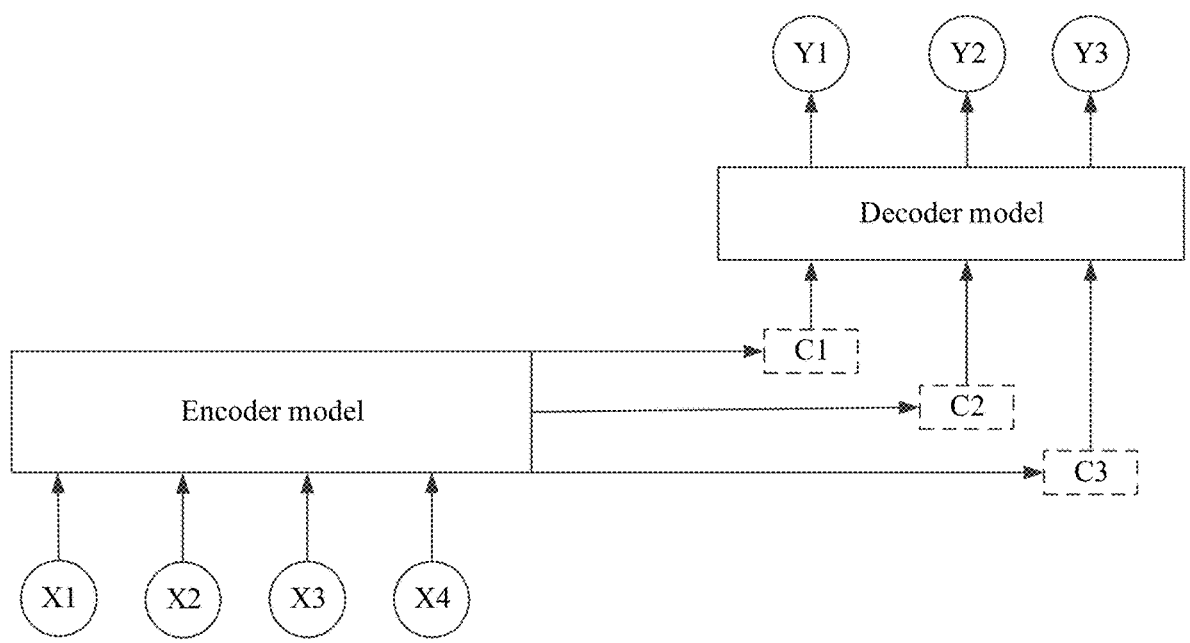
FIG. 1 is a schematic diagram of an encoder model-decoder model framework into which an attention model is introduced according to an embodiment of the present disclosure.

The present disclosure is further described in detail below with reference to the accompanying drawings. The embodiments provided herein are merely used for explaining the present disclosure instead of limiting the present disclosure. In addition, the embodiments provided below are some of the embodiments used to implement the present disclosure, rather than all of the embodiments used to implement the present disclosure. When there is no conflict, the technical solutions disclosed in the embodiments of the present disclosure may be implemented in any combination manner.

In the embodiments of the present disclosure, the terms "include", "comprise", or any other variant thereof is intended to cover a non-exclusive inclusion. Therefore, a method or an apparatus that includes a series of elements not only includes explicitly disclosed elements, but also includes other elements that are not explicitly listed, or may further include inherent elements for implementing the method or apparatus. Unless otherwise specified, an element limited by "include a/an . . . " does not exclude other related elements existing in the method or apparatus that includes the element (for example, steps in the method or units in the apparatus; for example, the units may be some circuits, some processors, some programs or software).

For example, the translation model based training method and the translation model based translation method provided in the embodiments of the present disclosure include a series of steps. However, the translation model based training method and the translation model based translation method provided in the embodiments of the present disclosure are not limited to the disclosed steps or any specific sequence thereof. Similarly, the translation model based training apparatus provided in the embodiments of the present disclosure includes a series of units. However, the apparatus provided in the embodiments of the present disclosure is not limited to including the explicitly disclosed units, and may also include units that need to be disposed when related information is obtained or processing is performed based on the information.

Before the present disclosure is further described in detail, nouns and terms involved in the embodiments of the present disclosure are described. The nouns and terms involved in the embodiments of the present disclosure are suitable for the following explanations.

1) A source sentence is a sentence that corresponds to a natural language and that is input into a translation model before language conversion is performed.

2) A target sentence is a sentence that corresponds to a natural language and that is outputted by the translation model after language conversion is performed on the source sentence.

3) A reference sentence is a preset reference standard that corresponds to a natural language after language conversion is performed on the source sentence.

4) Fidelity is a parameter that ranges from 0 to 1 and that represents the similarity between content of the target sentence and content of the source sentence, and is used as a standard for evaluating the translation accuracy of the source sentence. A larger value of the fidelity indicates a higher similarity between the content of the target sentence and the content of the source sentence, namely, higher translation accuracy.

5) A coverage is a parameter that ranges from 0 to 1 and that represents a ratio of the content of the target sentence that covers the content of the source sentence.

6) Translation is to convert a sentence of one natural language into a sentence of another natural language.

Before the embodiments of the present disclosure are further described in detail, a translation model formed by an encoder-decoder involved in the embodiments of the present disclosure is described.

A translation model in the embodiments of the present disclosure is attached with an attention model. Namely, the attention model is attached under an encoder-decoder frame. FIG. 1 is a schematic diagram of an encoder model-decoder model frame into which an attention model is introduced. A source sentence is inputted into a translation model, and a target sentence corresponding to a translation result corresponding to the source sentence is outputted. The source sentence and the target sentence are sentences of different natural languages.

During actual application, the target sentence outputted by the translation model may be obtained in the following manner: calculating a semantic vector corresponding to the source sentence by using an encoder model of the translation model; calculating, based on the semantic vector that is of a decoder model and that is inputted into the translation model, a state of the decoder model when the semantic vector is inputted, and a word outputted by the decoder model last time, a probability that candidate words are aligned to words in the source sentence; selecting a calculated candidate word that has a highest alignment probability as an outputted word; and connecting words outputted corresponding to the words of the source sentence, to form the target sentence.

The semantic vector corresponding to the source sentence may be calculated in the following manner: generating a vector sequence corresponding to the source sentence by using the encoder model of the translation model; allocating an attention probability to a word vector in the vector sequence of the source sentence by using an attention model; and performing weighted summation on the word vector in the vector sequence of the source sentence and the allocated attention probability, to obtain the semantic vector corresponding to the source sentence.

Figure 2:
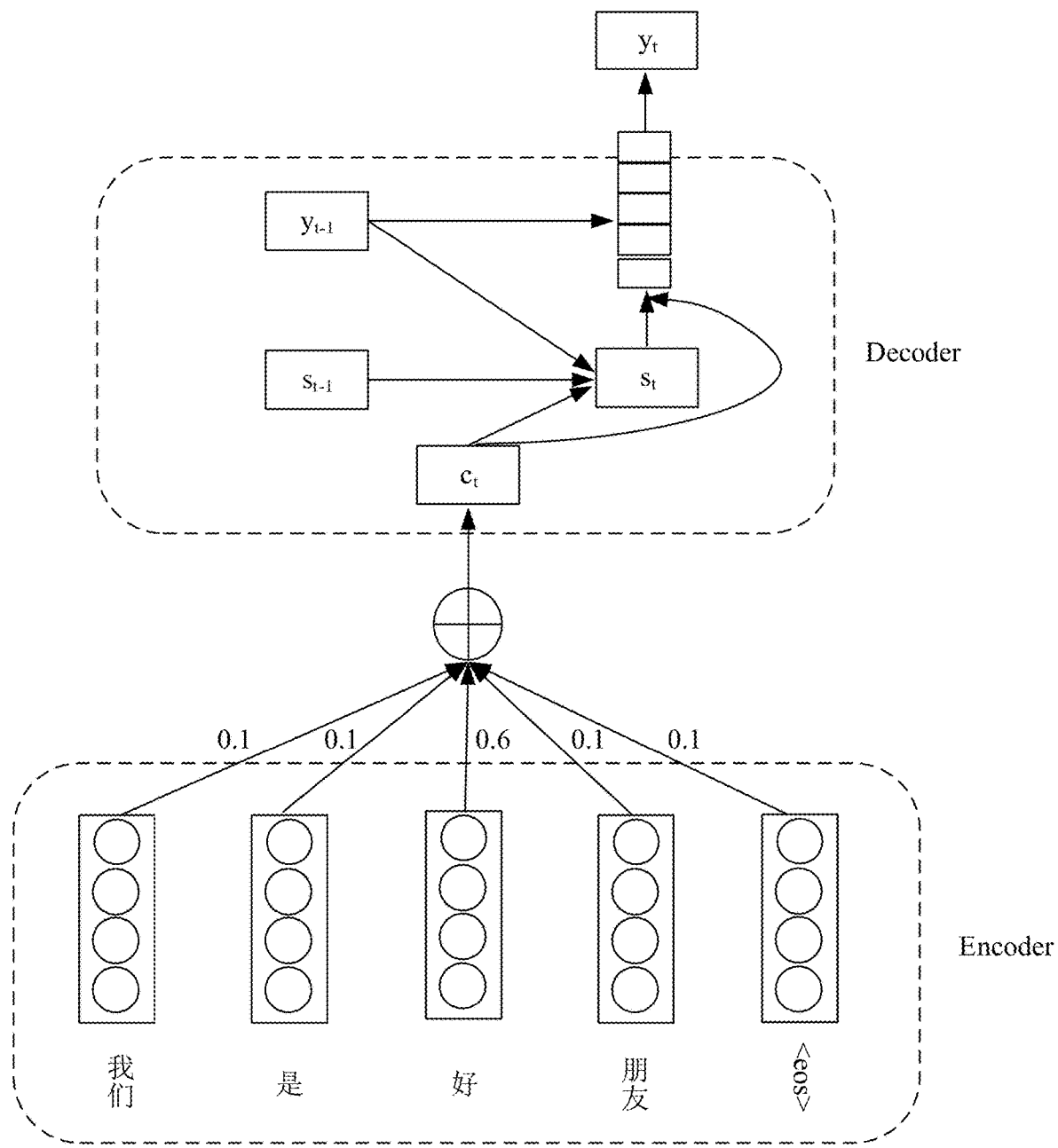
FIG. 2 is a block diagram of a translation model according to an embodiment of the present disclosure.

FIG. 2 is a schematic architectural diagram of a translation model according to an embodiment of the present disclosure. Referring to FIG. 2, a process in which the translation model of the present disclosure outputs a target sentence is described by using an example in which a source sentence is "我们是好朋友". The source sentence is inputted into the encoder model in the translation model. The encoder model encodes the input source sentence, to obtain a vector sequence corresponding to the source sentence. For example, the vector sequence obtained through encoding is denoted as $h_j$, $h_j$ being a semantic code corresponding to a jth word in the source sentence, as shown in a reference sign 1 part (that is, a sequence formed by a plurality of circles in a rectangular box, where "<eos>" is a sentence terminator) in FIG. 2. Then, the vector sequence of the source state and a previous moment state ($s_{t-1}$ in FIG. 2) of the decoder model in the translation model are read by using an attention model. An attention probability is allocated to each word vector in the vector sequence of the source sentence.

For example, the allocated attention probability is denoted as $a_{ij}$, $a_{ij}$ representing an antenna probability of a jth word in the source sentence when the decoder model of the translation model outputs an ith word, for example, "0.1, 0.1, 0.6, 0.1, 0.1" shown in FIG. 2. A larger value of $a_{ij}$ indicates more attention allocated by the ith output on the jth input, and higher impact of the jth input when the ith output is generated. Then, weighted summation is performed on the word vector in the vector sequence of the source sentence and the allocated attention probability, to obtain the semantic vector corresponding to the source sentence. The semantic vector is denoted as $c_i$, $c_i = \sum_{j=1}^{L_x} a_{ij} h_j$. $L_x$ represents a word length of the source sentence. For example, corresponding to the source sentence "我们是好朋友", assuming that the subscript corresponding to $c_i$ is "好" above, $L_x$ is 4, $h_1$=f("我们"), $h_2$=f("是"), $h_3$=f("好"), $h_4$=f("朋友"), the corresponding attention probabilities are respectively 0.1, 0.1, 0.6, and 0.1.

Then, the obtained semantic vector corresponding to the source sentence is inputted into the decoder model. The decoder model reads the semantic vector $c_i$ (indicating a to-be-translated word at a current moment), the state $s_{t-1}$ of the decoder model at a previous moment, and a word $y_{t-1}$ outputted by the decoder model last time, and outputs a state $s_t$ of the decoder mode at a current moment. Then, the decoder model calculates, based on the input semantic vector $c_i$, the current state $s_t$ of the decoder model, and the word $y_{t-1}$ outputted by the decoder model last time, a probability that candidate words are aligned to words in the source sentence. For example, when the word "好" is translated, it is obtained that the corresponding alignment probabilities of the candidate words "we", "good", and "friends" are respectively 0.1, 0.6, and 0.1, and "good" that has a highest alignment probability is selected as the word outputted by the decoder model, and words outputted corresponding to the words of the source sentence are sequentially connected, to form the target sentence.

However, in a process of translating a sentence by using the foregoing translation model, the decoder model outputs words corresponding to the words in the source sentence by using the state of the decoder model, the word outputted last time, and the like as input. Therefore, the decoder model needs to record lots of information, for example, content that needs to be translated, currently translated content, and the overall fluency of translation. That is, the decoder model has multiple tasks. Consequently, the translation model has severe missed-translation and repeated-translation phenomena during actual application.

Figure 3:
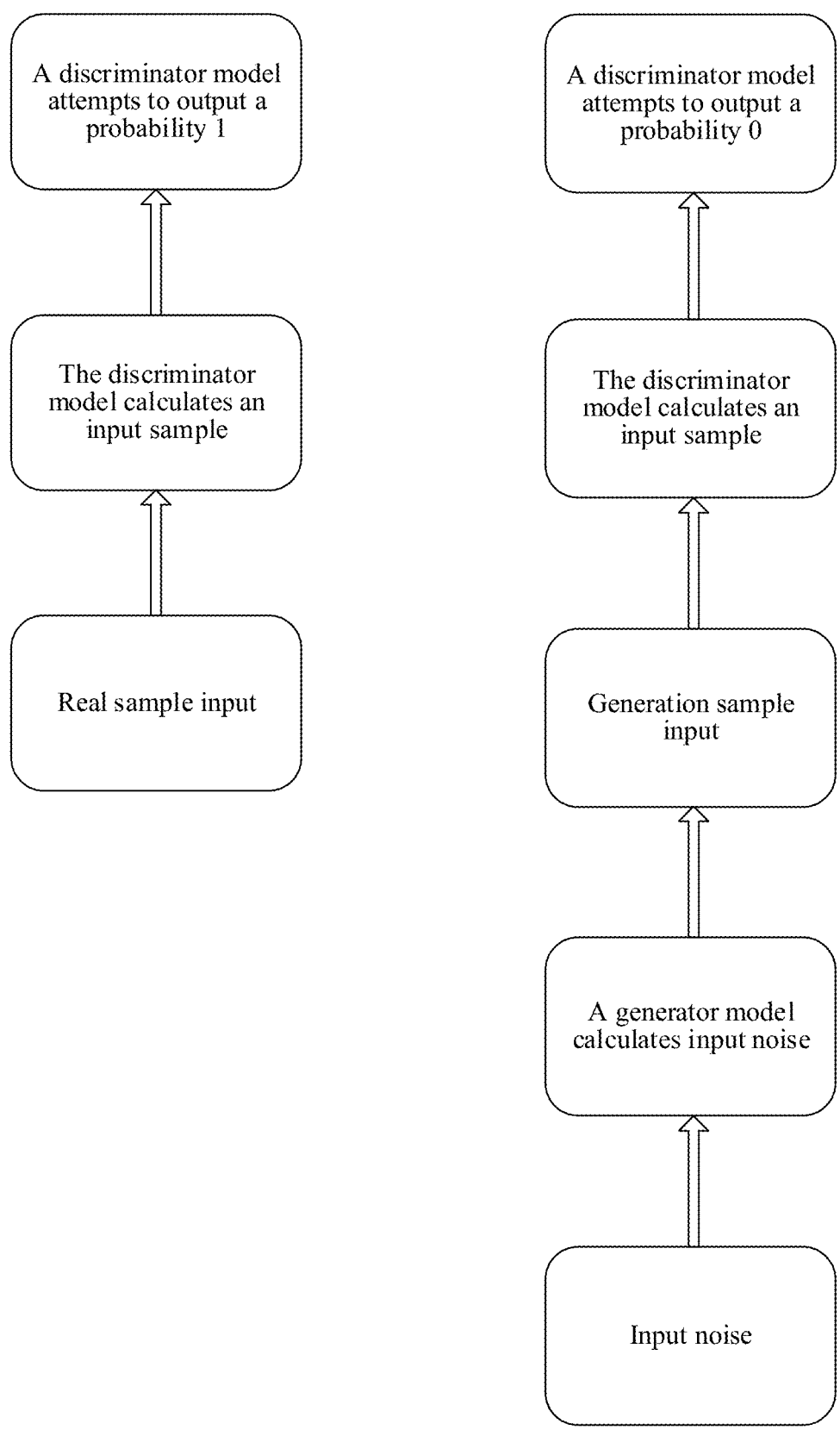
FIG. 3 is a schematic diagram of a discriminator model in a generative adversarial network model according to an embodiment of the present disclosure.

To resolve this problem, in certain embodiments, the translation model may be trained by using a generative adversarial network (GAN) model. The translation model is used as a generator model in the generative adversarial network model, and a convolutional neural network model is used as a discriminator model in the generative adversarial network model, to construct the generative adversarial network model formed by the generator model-discriminator model. The discriminator model is a classifier, and can determine, based on a probability, whether an input sentence is translated by human, and has an effect of distinguishing, to the greatest extent, a sentence that is really translated from a sentence translated by the generator model (translation model). FIG. 3 is a schematic diagram of a working principle of the discriminator model in the generative adversarial network model according to an embodiment of the present disclosure.

As shown in FIG. 3, real sample data is inputted into the discriminator model. The discriminator model performs calculation, and then makes the probability approach to 1 (true) to the greatest extent, and inputs noise meeting a particular distribution into the generator model. The generator model performs calculation to generate generation samples, and then inputs the generation samples into the discriminator model. The discriminator model performs calculation, and then makes the output probability approach to 0 (false) to the greatest extent. On the other hand, the objective of the generator (translation model) is to simulate, to the greatest extent, a sentence translated by human (real translation), so that the discriminator model cannot determine whether the input sentence is translated by human or translated by the generator (translation model). In a process in which the generative adversarial network model is applied, the generator captures distribution of sample data, and generates a sample similar to real training data by using noise meeting a particular distribution (uniform distribution, Gaussian distribution, or the like), that is, generates a target sentence similar to a reference sentence. The discriminator model combines every two of the word vectors corresponding to the words in the source sentence and the target sentence into a three-dimensional "image". The three-dimensional "image" is inputted into the discriminator model, and a probability that the target sentence is real translation is outputted. In one embodiment of the present disclosure, there are two probabilities, 0 and 1 respectively. When the probability is 0, it indicates that the target sentence is false, namely, translated by non-human (machine), and when the probability is 1, it indicates that the target sentence is true, namely, translated by a human.

In a process in which the discriminator model is trained, there are two corresponding sentences for the source sentence, respectively, a reference sentence translated by a human and a target sentence translated by a machine. The target sentence corresponding to the source sentence is used as an input sample, and the corresponding probability 0 is used as an output sample, to construct a training sample. The reference sentence corresponding to the source sentence is used as an input sample, and the corresponding probability 1 is used as an output sample, to construct a training sample. The discriminator model is trained, so that the discriminator model has performance of identifying whether the input sentence is translated by human. In a process in which the generator is trained, because training samples of the generator is discrete (the probability of the target sentence corresponding to the source sentence is 0 or 1), a back propagation algorithm cannot be used for training. In some embodiments, a policy gradient algorithm may be used for training. The formula is as follows:

$$\nabla_{\theta_G} \approx -\log(1-D(x,y'))\nabla_{\theta_G} \log G(y'|x).$$

$\theta_G$ is a parameter of the generator; $\nabla_{\theta_G}$ of the generator is a gradient; a parameter x is inputted (source sentence) of the generator; y' is output (target sentence) of the generator; D(x, y') is a probability that y' is x real translation; $\nabla_{\theta_G}$ log G(y'|x) is a standard gradient of the generator, that is, a gradient obtained by using a maximum likelihood estimate algorithm.

The parameter of the generator is updated by using the following formula:

$$\theta' = \theta - \alpha \nabla_\theta.$$

$\theta'$ is an updated parameter of the generator, and $\alpha$ is a learning rate. It can be learned that a larger D(x,y') indicates a corresponding larger $\nabla_{\theta_G}$ log G(y'|x), so that the updated parameter of the generator is larger.

It can be learned that when the translation model is trained by using the generative adversarial network model, although the accuracy of the translation of the translation model can be partially improved, a target function of the discriminator model in the process in which the translation model is trained is not sufficiently accurate, and probabilities corresponding to all sentences translated by a machine are identified as 0, and probabilities corresponding to all sentences translated by human are identified as 1. However, the sentences translated by the machine are of different qualities, and not all sentences translated by the machine are undesirable, and if a probability corresponding to a sentence that is relatively well translated by the machine is identified as 0, the parameter update in the model training process is necessarily inaccurate.

To avoid the missed-translation and repeated-translation phenomena well, and to improve the accuracy of the translation of the translation model to the greatest extent, a training scheme of the translation model of one embodiment of the present disclosure is provided. The training scheme of the translation model of one embodiment of the present disclosure is based on the generative adversarial network model. The translation model is used as a generator in the generative adversarial network model. A discriminator model is added to train the translation model. The training scheme of the translation model of one embodiment of the present disclosure is described below in detail with reference to specific embodiments.

Figure 4:
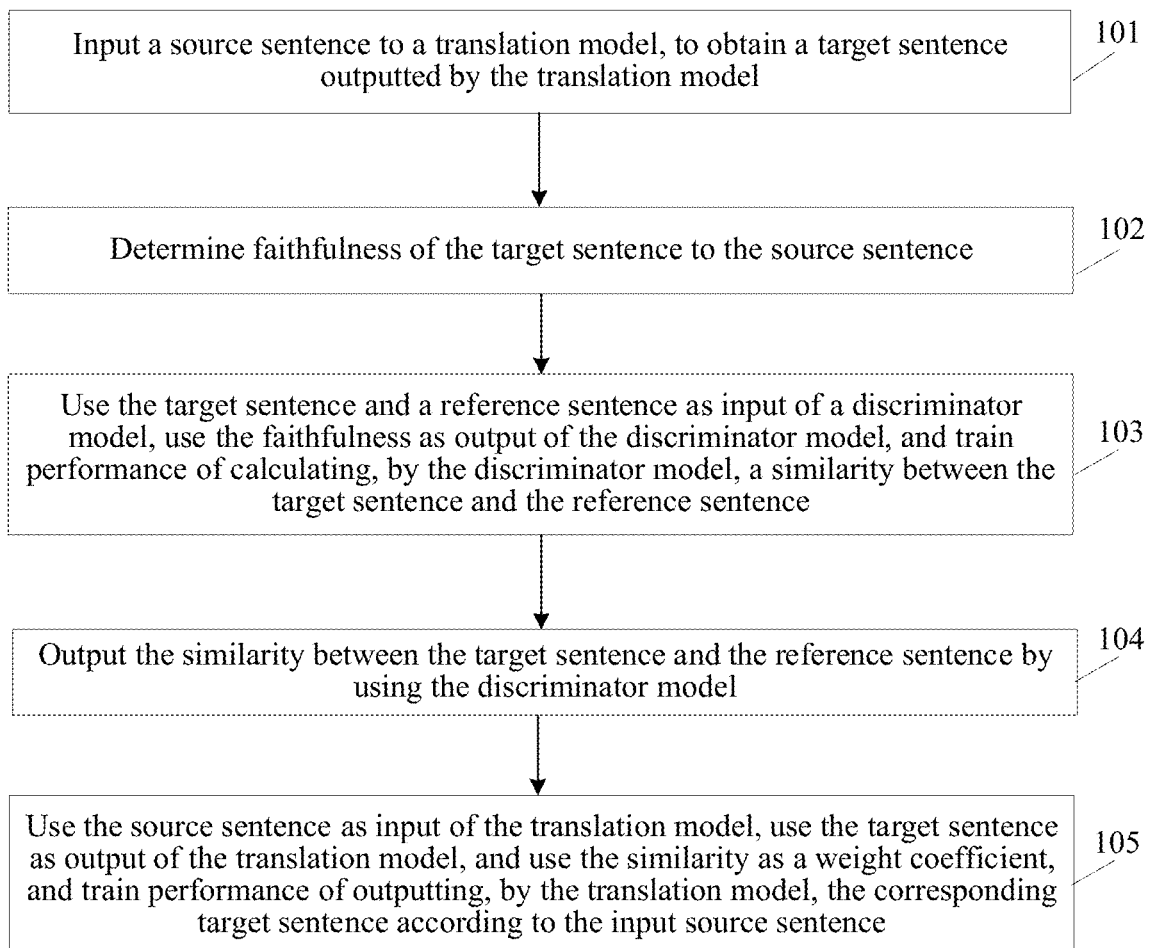
FIG. 4 is a schematic flowchart of a translation model based training method according to an embodiment of the present disclosure.
Figure 5:
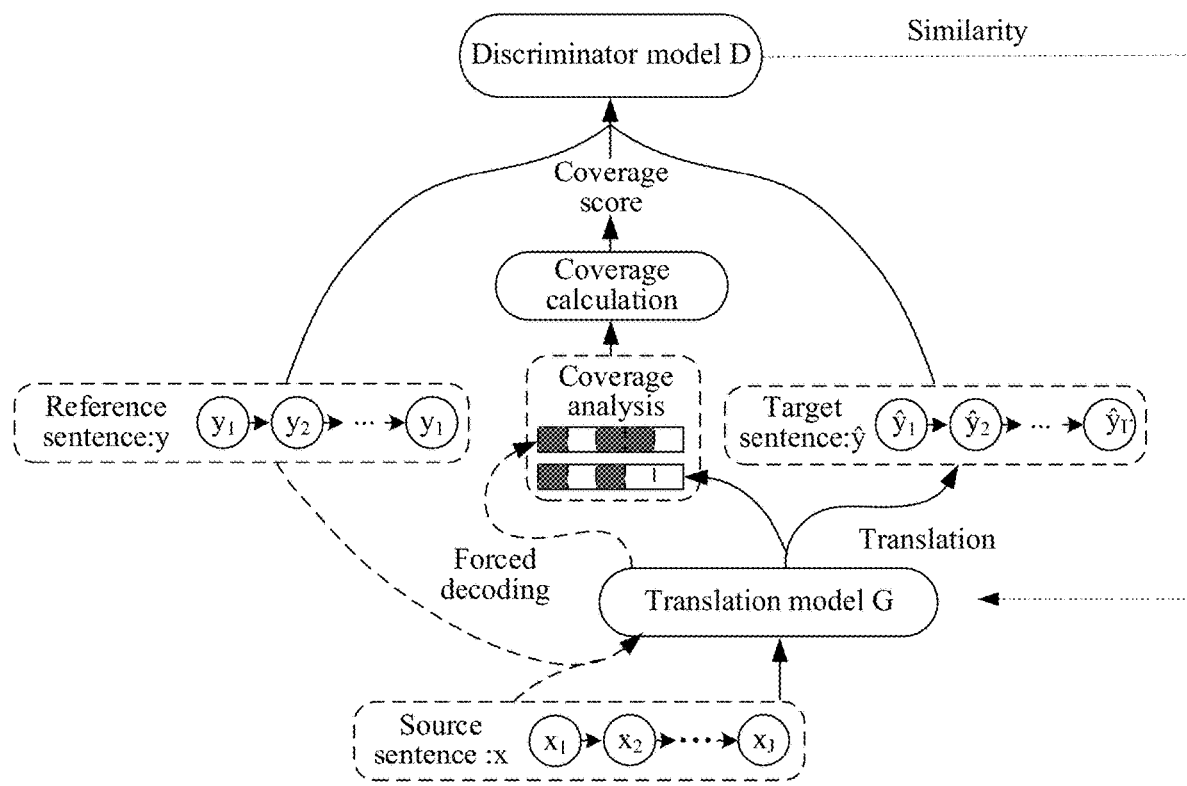
FIG. 5 is a schematic diagram of an architecture of a translation model based training system according to an embodiment of the present disclosure.

FIG. 4 is a schematic flowchart of a translation model based training method according to an embodiment of the present disclosure. FIG. 5 is a schematic diagram of an architecture of a translation model based training system according to an embodiment of the present disclosure. As shown in FIG. 4 and FIG. 5, the translation model based training method of one embodiment of the present disclosure includes the followings.

Step 101: Input a source sentence to a translation model, to obtain a target sentence outputted by the translation model.

Figure 6:
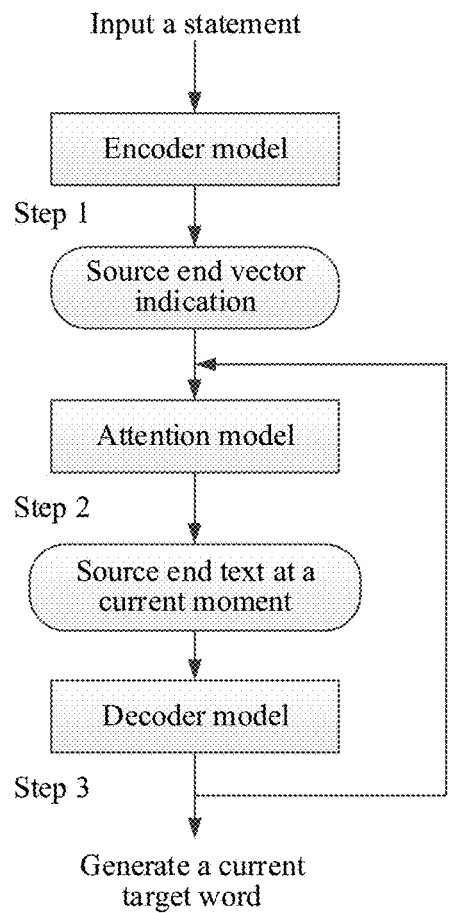
FIG. 6 is a schematic flowchart of a translation process based on a translation model according to an embodiment of the present disclosure.

FIG. 6 is a schematic flowchart of a translation process of a translation model according to an embodiment of the present disclosure. As shown in FIG. 6, a translation process (a source sentence of one natural language is converted into a target sentence of another natural language) of the translation model mainly includes the following three steps.

Step 1: Calculate a semantic vector corresponding to the source sentence by using an encoder model of the translation model, namely, a source end vector indication $c_i$ is generated.

The source end mentioned in one embodiment of the present disclosure corresponds to an encoder model end. The target end corresponds to a decoder model end. A source sentence is inputted into the encoder model. The encoder model encodes the source sentence, to obtain a vector sequence formed by at least one word vector. Each word vector corresponds to a word in the source sentence. For example, the source sentence is "我来自中国", and after the source sentence is encoded by the encoder model, a source end vector sequence formed by word vectors $h_1$, $h_2$, and $h_3$ corresponding to "我", "来自", and "中国" is obtained. Then the attention model reads the vector sequence of the encoder model and a previous moment state of the decoder model, and allocates an attention probability ranging from 1 to 1 to each word in the source sentence. For example, attention probabilities corresponding to "我", "来自", and "中国" are respectively 1, 0, and 0, and a larger value indicates closer correlation between the word and a to-be-generated target word. Weighted summation is performed on the attention probability and the vector sequence to generate a source end vector indication $c_i$ of the current moment, namely, a semantic vector $c_i$ corresponding to the source sentence is obtained, $c_i = \sum_{j=1}^{L_x} a_{ij} h_j$. $L_x$ represents a word length of the source sentence, $a_{ij}$ represents an attention probability of a jth word in the source sentence when the decoder model of the translation model outputs an ith word, and $h_j$ is a semantic code corresponding to the jth word in the source sentence.

Step 2: Update the state of the decoder model.

The decoder model reads the source end vector indication (namely, content of the source sentence to be translated at a current moment), the state $s_{t-1}$ of the decoder model at a previous moment, and a previous word $y_{t-1}$ outputted by the decoder model, and outputs a state $s_t$ of the decoder model at the current moment.

Step 3: The decoder model generates a target end word at the current moment.

The decoder model calculates, according to the state $s_t$ of the decoder at the current moment, the source end vector indicator $c_t$, and a previous generated word $y_{t-1}$, a probability that candidate words are aligned to words in the source sentence, and selects a word that has a highest alignment probability (similarity) as the final input, i.e., as the target word.

After obtaining the target word corresponding to each word in the source sentence, the decoder model connects words outputted corresponding to the words of the source sentence, to form a target sentence.

Step 102: Determine the fidelity of the target sentence to the source sentence.

In some embodiments, fidelity of the target sentence may be represented by using a coverage of the target sentence. Namely, the coverage is used as a standard for evaluating the translation accuracy of the source sentence. A larger value indicates higher accuracy of the translation. FIG. 5 is a system architecture in which a translation model is trained by using an example in which the fidelity is the coverage. As shown in FIG. 5, the source sentence and the reference sentence are inputted into the translation model, and after translation is performed by the translation model, a first alignment matrix of the target sentence and the source sentence is obtained, and a second alignment matrix of the reference sentence and the source sentence is obtained through forced decoding. Then, the first alignment matrix and the second alignment matrix are inputted into a coverage calculation module. The coverage calculation module performs calculation to obtain the coverage (namely, the coverage dispersion) of the target sentence, for input into the discriminator model.

In an embodiment, the coverage of the target sentence may be determined in the following manner: obtaining a first coverage quantity of words of the target sentence that cover words of the source sentence; and obtaining a second coverage quantity of words of the reference sentence that cover the words of the source sentence; calculating a difference between the first coverage quantity and the second coverage quantity; and calculating a ratio of the difference to the second coverage quantity as the coverage of the target sentence.

In an embodiment, the first coverage quantity of the words of the target sentence that cover the words of the source sentence may be obtained in the following manner: aligning a vector of each word in the target sentence to a vector of a corresponding word in the source sentence to form a first alignment matrix in a process of obtaining a vector sequence of the target sentence outputted by the translation model; and collecting, from the first alignment matrix, statistics on the first coverage quantity of the words of the target sentence that cover the words of the source sentence.

Figure 7:
FIG. 7 is a schematic diagram of an example in which words in a statement are aligned according to an embodiment of the present disclosure.

During actual implementation, because the translation model converts the source sentence into the target sentence based on the attention model, as shown in FIG. 1, in a process in which the target sentence outputted by the translation model is obtained, alignment between the target sentence and the source sentence may be implemented by using the attention model, to obtain the alignment matrix, and then the quantity of words of the target sentence that cover the source sentence is obtained through statistics collection. FIG. 7 is a schematic diagram of an example in which words in a sentence are aligned according to an embodiment of the present disclosure.

As shown in FIG. 7, "二十六岁男司机被困车内，由到场的消防员救出." is the source sentence, and the part shown by the reference sign 1 (marked in dark color) indicates that the words in the target sentence are aligned to the words in the source sentence, that is, indicates that the words of the source sentence are covered. It can be learned through statistics collection that the first coverage quantity of the words of the target sentence that cover words of the source sentence in FIG. 7 is 4.

In an embodiment, the second coverage quantity of the words of the reference sentence that cover the words of the source sentence may be obtained in the following manner: separately obtaining vector sequences corresponding to the reference sentence and the source sentence; aligning vectors corresponding to same words in the vector sequence of the source sentence and the vector sequence of the reference sentence, to obtain a second alignment matrix; and collecting, from the second alignment matrix, statistics on the second coverage quantity of the words of the reference sentence that cover the words of the source sentence. During actual implementation, because the reference sentence may be considered as a standard translation of the source sentence, alignment information of the reference sentence may be obtained in a forced decoding manner. Referring to FIG. 7, in FIG. 7, the part shown by the reference sign 2 (also marked in dark color) indicates that the words in the reference sentence are aligned to the words in the source sentence, that is, words of the source sentence are covered. It can be learned through statistics collection that the first coverage quantity of the words of the reference sentence that cover words of the source sentence in FIG. 7 is 7.

After the first coverage quantity and the second coverage quantity are obtained, a ratio of a difference between the first coverage quantity and the second coverage quantity to the second coverage quantity as the coverage $CDR(y'|y,x)$ of the target sentence by using the following formula:

$$CDR(y' \mid y, x) = \frac{|C_{ref} - C_{gen}|}{|C_{ref}|}.$$

$C_{ref}$ is the quantity of the words of the reference sentence that cover the words of the source sentence; and $C_{gen}$ is the quantity of the words of the target sentence that cover the words of the source sentence. Calculation is performed by using the example in FIG. 7, and it can be obtained that the coverage of the target sentence for the source sentence is: $(7-4)/7=0.43$. In this way, an association between the target sentence and the reference sentence is established. During actual application, because some source end words (for example, function words) have no actual meaning, the source end words do not need to be covered. Through comparison with the reference sentence, impact of the words can be excluded. In addition, because the accuracy of the current alignment information is not completely correct (for example, to align to a source end word, several consecutive words centered around the source end word may be covered), it may be considered that if the word coverage status of the target sentence is close to the word coverage status of the reference sentence, the sentence has high fidelity.

In some embodiments, the fidelity of the target sentence may be represented by using a bilingual evaluation understudy (BLEU) value of the target sentence. In some embodiments, the BLEU value of the target sentence may be implemented in the following manner: matching words in the target sentence and words in the reference sentence, to obtain a quantity of same words in the target sentence and the reference sentence; and calculating a ratio of the obtained quantity of same words to a quantity of the words in the target sentence as the BLEU value. Namely, the BLEU value is used as the standard for evaluating the accuracy of the source sentence, and a larger value indicates higher accuracy of the translation.

Step 103: Use the target sentence and a reference sentence as input of a discriminator model, use the fidelity as output of the discriminator model, and train the discriminator model on the performance of calculating a similarity between the target sentence and the reference sentence.

Description is provided by using an example in which the fidelity of the target sentence is the coverage of the target sentence. The target sentence and the reference sentence are used as an input sample, and the coverage is used as an output sample, to construct a training sample set. The discriminator model is trained. The performance of determining, by the discriminator model, the similarity between the target sentence and the reference sentence is trained, and an association between the target sentence and the reference sentence is established.

Step 104: Output the similarity between the target sentence and the reference sentence by using the discriminator model.

In an embodiment, the discriminator model may be formed by three neural network models. The discriminator model may calculate the similarity between the target sentence and the reference sentence in the following manner: encoding the target sentence by using a first neural network model in the discriminator model, to obtain a first encoding vector; encoding the reference sentence by using a second neural network model in the discriminator model, to obtain a second encoding vector; and inputting the first encoding vector and the second encoding vector into a third neural network model in the discriminator model for similarity calculation, to obtain the similarity between the target sentence and the reference sentence.

In some embodiments, the first neural network model and the second neural network model in the discriminator model may be both convolutional neural network models. In some other embodiments, the first neural network model and the second neural network model in the discriminator model may also be both recurrent neural network models. During actual application, the recurrent neural network models are used as the first neural network model and the second neural network model for training the discriminator model. With respect to use of the convolutional neural network models as the first neural network model and the second neural network model for training the discriminator model, this is equivalent to converting a classification problem into a regression problem, to improve the speed of training the translation model (namely, the quantity of words processed per unit of time).

Using an example in which the first neural network model and the second neural network model are recurrent neural network models, a process of outputting the similarity between the target sentence and the reference sentence by using the discriminator model includes: respectively inputting the target sentence and the reference sentence into two recurrent neural network models for encoding, outputting a first encoding vector and a second encoding vector corresponding to the target sentence and the reference sentence, and then inputting the first encoding vector and the second encoding vector into a feedforward neural network model, to calculate a similarity therebetween.

Step 105: Use the source sentence as input of the translation model, use the target sentence as output of the translation model, and use the similarity as a weight coefficient, and train the translation model on the performance of outputting the corresponding target sentence according to the input source sentence.

Specifically, after the discriminator model is trained once, the translation model is trained by using the similarity outputted by the discriminator model. The objective of the training is to make the discriminator model consider that the similarity between the target sentence outputted by the translation model and the reference sentence is high, for example, 1. The training of the discriminator is based on the target sentence obtained through translation by the translation model, to form linkage between the discriminator model and the translation model.

In an embodiment, the translation model may be trained in the following manner: initializing an input layer, an intermediate layer, and an output layer that are included by the translation model; constructing a training sample set, the training sample set including to-be-translated source sentences and target sentences as translation results corresponding to the source sentences; initializing a loss function established based on the input of the translation model, the output of the translation model, and a translation model parameter(s); using source sentences of selected training samples as input, using target sentences of the selected training samples as output, and calculating, by using a maximum likelihood estimate algorithm, an updated value of the translation model parameter in a dimension that corresponds to the selected training sample when the loss function obtains a minimum value relative to the selected training samples; fusing updated values corresponding to selected training samples based on a similarity between the corresponding samples; and updating the translation model parameter based on an updated value that is obtained through fusion and that is of the translation model parameters corresponding to the training sample set. During actual implementation, the translation model parameter may be updated in a manner of superposing the updated value that is obtained through fusion and that is of the translation model parameter corresponding to the training sample set and the translation model parameter before the update.

Thus, the discriminator model is trained based on the target sentence outputted by the translation model, and the translation model is trained based on the similarity between the target sentence outputted by the discriminator model and the reference sentence, to implement linkage between the discriminator model and the translation model, so that the accuracy of the translation model obtained through training is high, and the miss-translation and repeated-translation phenomena are well avoided.

Figure 8:
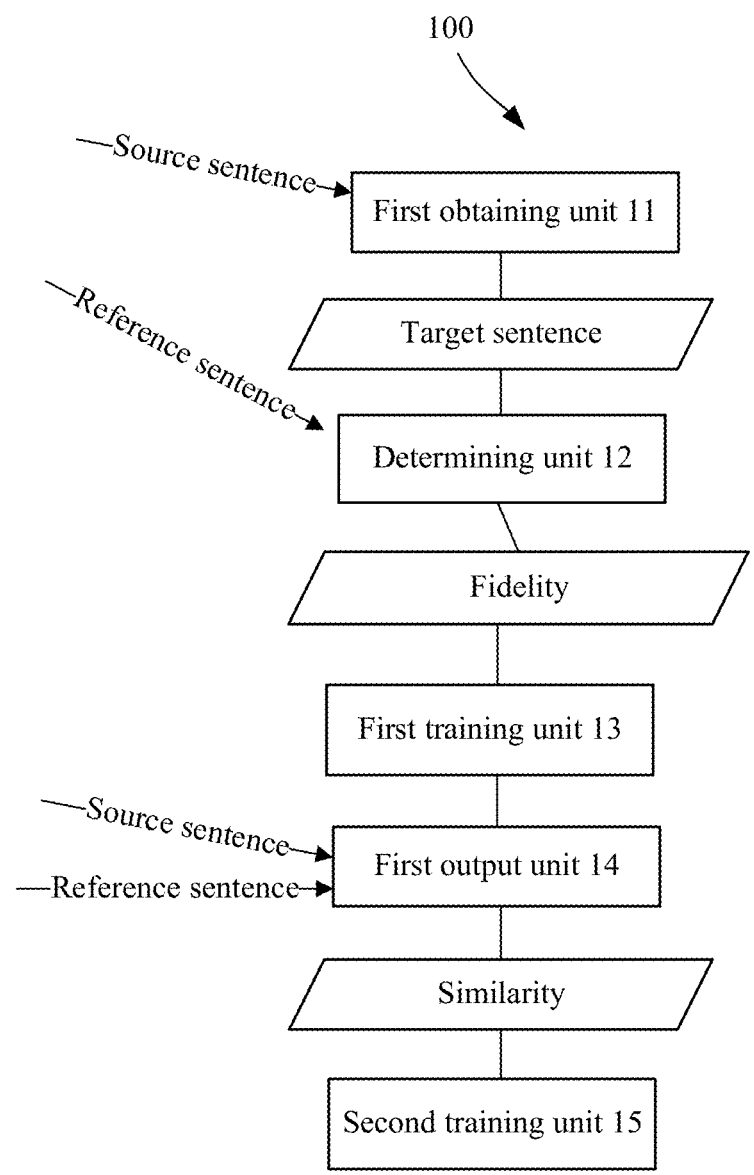
FIG. 8 is a block diagram of a translation model based training apparatus according to an embodiment of the present disclosure.

An embodiment of the present disclosure further provides a translation model based training apparatus 100. FIG. 8 is a schematic structural diagram of a composition of the translation model based training apparatus according to one embodiment of the present disclosure. The training apparatus 100 includes: a first obtaining unit 11, a determining unit 12, a first training unit 13, a first output unit 14, and a second training unit 15, etc.

The first obtaining unit 11 is configured to input a source sentence to a translation model, to obtain a target sentence outputted by the translation model. The determining unit 12 is configured to determine fidelity of the target sentence to the source sentence. The first training unit 13 is configured to: use the target sentence and a reference sentence as input of a discriminator model, use the fidelity as output of the discriminator model, and train the discriminator model on the performance of calculating a similarity between the target sentence and the reference sentence.

The first output unit 14 is configured to output the similarity between the target sentence and the reference sentence by using the discriminator model. The second training unit 15 is configured to: use the source sentence as input of the translation model, use the target sentence as output of the translation model, and use the similarity as a weight coefficient, and train the translation model on the performance of outputting, the corresponding target sentence according to the input source sentence.

In some embodiments, the determining unit 12 is further configured to: in response to that the fidelity is a coverage, obtain a first coverage quantity of words of the target sentence that cover words of the source sentence; obtain a second coverage quantity of words of the reference sentence that cover the words of the source sentence; calculate a difference between the first coverage quantity and the second coverage quantity; and calculate a ratio of the difference to the second coverage quantity as the coverage.

In some embodiments, the determining unit 12 is further configured to: obtain a vector of each word in the target sentence to a vector of a corresponding word in the source sentence to form a first alignment matrix in a process of obtaining a vector sequence of the target sentence outputted by the translation model; and collect, from the first alignment matrix, statistics on the first coverage quantity of the words of the target sentence that cover the words of the source sentence.

In some embodiments, the determining unit 12 is further configured to: separately obtain vector sequences corresponding to the reference sentence and the source sentence; align vectors corresponding to same words in the vector sequence of the source sentence and the vector sequence of the reference sentence, to obtain a second alignment matrix; and collect, from the second alignment matrix, statistics on the second coverage quantity of the words of the reference sentence that cover the words of the source sentence.

In some embodiments, the determining unit 12 is further configured to: match words in the target sentence and words in the reference sentence in response to that the fidelity is a bilingual evaluation understudy value, to obtain a quantity of same words in the target sentence and the reference sentence; and calculate a ratio of the obtained quantity to a quantity of the words in the target sentence as the bilingual evaluation understudy value.

In some embodiments, the first output unit 14 is further configured to: encode the target sentence by using a first neural network model in the discriminator model, to obtain a first encoding vector; encode the reference sentence by using a second neural network model in the discriminator model, to obtain a second encoding vector; and input the first encoding vector and the second encoding vector into a third neural network model in the discriminator model for similarity calculation, to obtain the similarity between the target sentence and the reference sentence.

In some embodiments, the second training unit 15 is further configured to: initialize an input layer, an intermediate layer, and an output layer that are included by the translation model; construct a training sample set, the training sample set including to-be-translated source sentences and target sentences of a translation result corresponding to the source sentences; initialize a loss function established based on the input of the translation model, the output of the translation model, and a translation model parameter; use source sentences of selected training samples as input, use target sentences of the selected training sample as output, and calculate an updated value of the translation model parameter in a dimension that corresponds to the selected training sample; fuse updated values corresponding to selected training samples based on a similarity between the corresponding samples; and update the translation model parameter based on an updated value that is obtained through fusion and that is of the translation model parameter corresponding to the training sample set.

In some embodiments, the first obtaining unit 11 is further configured to: calculate a semantic vector corresponding to the source sentence by using an encoder model of the translation model; calculate, based on the semantic vector that is of a decoder model and that is inputted into the translation model, a state of the decoder model when the semantic vector is inputted, and a word outputted by the decoder model last time, a probability that candidate words are aligned to words in the source sentence; select a calculated candidate word that has a highest alignment probability as an outputted word; and connect words outputted corresponding to the words of the source sentence, to form the target sentence.

In some embodiments, the first obtaining unit 11 is further configured to: generate a vector sequence corresponding to the source sentence by using the encoder model of the translation model; allocate an attention probability to a word vector in the vector sequence of the source sentence by using an attention model; and perform weighted summation on the word vector in the vector sequence of the source sentence and the allocated attention probability, to obtain the semantic vector corresponding to the source sentence.

Based on the foregoing descriptions of the translation model based training method and apparatus, training of the translation model can be easily implemented and the translation model obtained through training can be easily applied.

Figure 9:
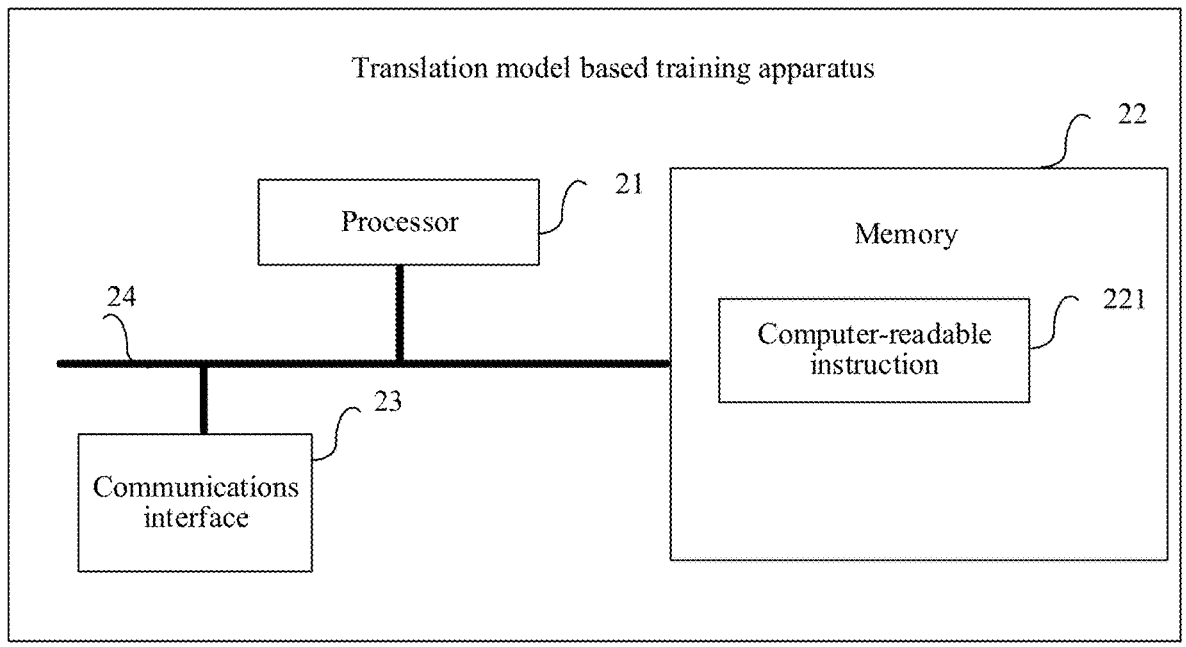
FIG. 9 is a block diagram of a translation model based training apparatus according to another embodiment of the present disclosure.

The translation model based training apparatus of one embodiment of the present disclosure may be implemented on the computer device shown in FIG. 9. The computer device may be a terminal or a server. It may be understood that each of the modules included in the translation model based training apparatus may be completely or partially implemented by using software, hardware, or a combination thereof.

An embodiment of the present disclosure further provides a computer device. FIG. 9 is a block diagram of a computer device according to one embodiment of the present disclosure. The computer device includes one or more processors 21, a memory 22, and at least one external communications interface 23. The one or more processors 21, the memory 22, and the external communications interface 23 are all connected by using a bus 24.

The memory 22 is configured to store computer-readable instructions 221.

The one or more processors 21 are configured to execute the computer-readable instructions stored in the memory to implement the following steps: inputting a source sentence to a translation model, to obtain a target sentence outputted by the translation model; determining fidelity of the target sentence to the source sentence; using the target sentence and a reference sentence as input of a discriminator model, using the fidelity as output of the discriminator model, and training the discriminator model on the performance of calculating a similarity between the target sentence and the reference sentence; outputting the similarity between the target sentence and the reference sentence by using the discriminator model; and using the source sentence as input of the translation model, using the target sentence as output of the translation model, and using the similarity as a weight coefficient, and training the translation model on the performance of outputting the corresponding target sentence according to the input source sentence.

The processors 21 are further configured to execute the computer-readable instructions stored in the memory to implement the following steps: in response to that the fidelity is a coverage, obtaining a first coverage quantity of words of the target sentence that cover words of the source sentence; obtaining a second coverage quantity of words of the reference sentence that cover the words of the source sentence; calculating a difference between the first coverage quantity and the second coverage quantity; and calculating a ratio of the difference to the second coverage quantity as the coverage.

The processors 21 are further configured to execute the computer-readable instructions stored in the memory to implement the following steps: aligning a vector of each word in the target sentence to a vector of a corresponding word in the source sentence to form a first alignment matrix in a process of obtaining a vector sequence of the target sentence outputted by the translation model; and collecting, from the first alignment matrix, statistics on the first coverage quantity of the words of the target sentence that cover the words of the source sentence.

The processors 21 are further configured to execute the computer-readable instructions stored in the memory to implement the following steps: separately obtaining vector sequences corresponding to the reference sentence and the source sentence; aligning vectors corresponding to same words in the vector sequence of the source sentence and the vector sequence of the reference sentence, to obtain a second alignment matrix; and collecting, from the second alignment matrix, statistics on the second coverage quantity of the words of the reference sentence that cover the words of the source sentence.

The processors 21 are further configured to execute the computer-readable instructions stored in the memory to implement the following steps: matching words in the target sentence and words in the reference sentence in response to that the fidelity is a bilingual evaluation understudy value, to obtain a quantity of same words in the target sentence and the reference sentence; and calculating a ratio of the obtained quantity to a quantity of the words in the target sentence as the bilingual evaluation understudy value.

The processors 21 are further configured to execute the computer-readable instructions stored in the memory to implement the following steps: encoding the target sentence by using a first neural network model in the discriminator model, to obtain a first encoding vector; encoding the reference sentence by using a second neural network model in the discriminator model, to obtain a second encoding vector; and inputting the first encoding vector and the second encoding vector into a third neural network model in the discriminator model for similarity calculation, to obtain the similarity between the target sentence and the reference sentence.

The processors 21 are further configured to execute the computer-readable instructions stored in the memory to implement the following steps: initializing an input layer, an intermediate layer, and an output layer that are included by the translation model; constructing a training sample set, the training sample set including a to-be-translated source sentence and a target sentence of a translation result corresponding to the source sentence; initializing a loss function established based on the input of the translation model, the output of the translation model, and a translation model parameter; using a source sentence of a selected training sample as input, using a target sentence of the selected training sample as output, and calculating an updated value of a dimension that is in the translation model parameter and that corresponds to the selected training sample when the loss function obtains a minimum value relative to the selected training sample; fusing updated values corresponding to selected training samples based on a similarity between the corresponding samples; and updating the translation model parameter based on an updated value that is obtained through fusion and that is of the translation model parameter corresponding to the training sample set.

The processors 21 are further configured to execute the computer-readable instructions stored in the memory to implement the following steps: calculating a semantic vector corresponding to the source sentence by using an encoder model of the translation model; calculating, based on the semantic vector that is of a decoder model and that is inputted into the translation model, a state of the decoder model when the semantic vector is inputted, and a word outputted by the decoder model last time, a probability that candidate words are aligned to words in the source sentence; selecting a calculated candidate word that has a highest alignment probability as an outputted word; and connecting words outputted corresponding to the words of the source sentence, to form the target sentence.

The processors 21 are further configured to execute the computer-readable instructions stored in the memory to implement the following steps: generating a vector sequence corresponding to the source sentence by using the encoder model of the translation model; allocating an attention probability to a word vector in the vector sequence of the source sentence by using an attention model; and performing weighted summation on the word vector in the vector sequence of the source sentence and the allocated attention probability, to obtain the semantic vector corresponding to the source sentence.

Figure 10:
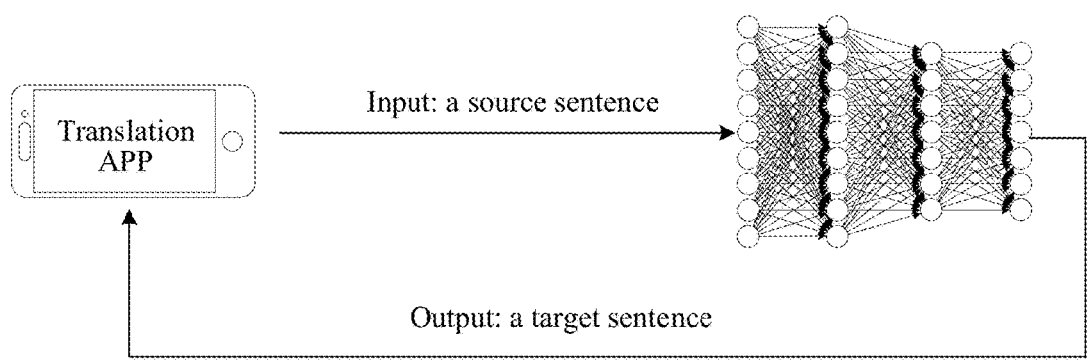
FIG. 10 is a schematic diagram of an application scenario of a translation model according to an embodiment of the present disclosure.

For example, a translation model based training apparatus is applied to a terminal. FIG. 10 is a schematic diagram of an application scenario of a translation model according to an embodiment of the present disclosure. The terminal is provided with a translation application (APP) and a training apparatus of a translation model. The terminal performs training based on the foregoing translation model based training method to obtain the translation model, and then updates the translation APP of the terminal by using the translation model obtained through training. When a user inputs a source sentence based on the updated translation APP, the translation model translates the source sentence and outputs a corresponding target sentence.

Figure 11:
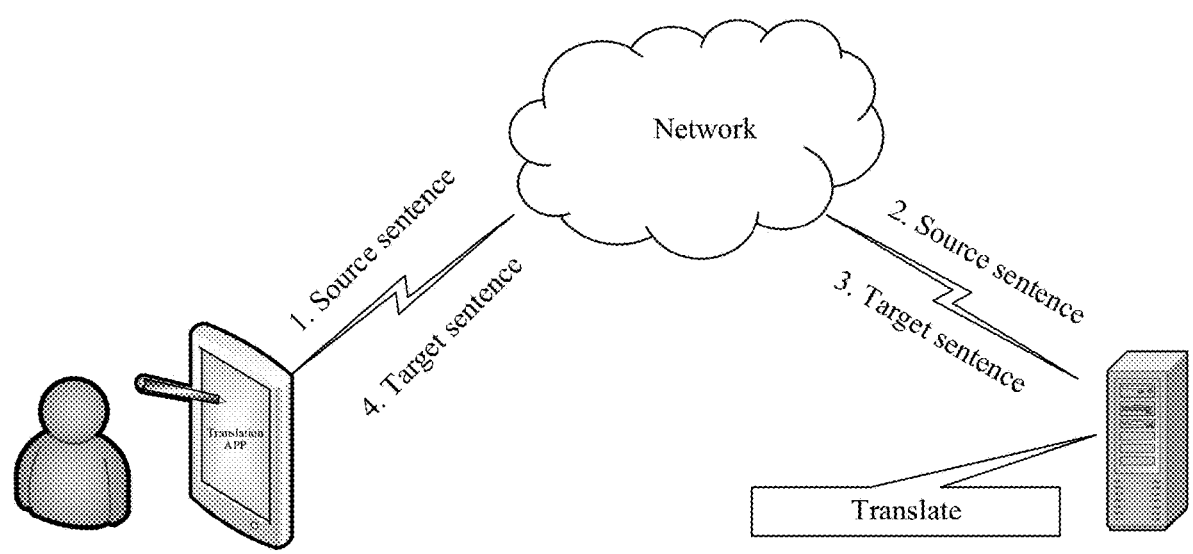
FIG. 11 is a schematic diagram of an application scenario of a translation model according to another embodiment of the present disclosure.

For example, a translation model based training apparatus is applied to a server. FIG. 11 is a schematic diagram of an application scenario of a translation model according to an embodiment of the present disclosure. The terminal is provided with a translation APP. The server is provided with a training apparatus of a translation model. The server performs training based on the foregoing translation model based training method to obtain the translation model, and then synchronizes the translation model obtained through training to the terminal. When a user inputs a source sentence based on the updated translation APP, the translation APP submits the source sentence to the server. Then the translation model on the server translates the source sentence, and returns the target sentence obtained through translation to the terminal.

Based on the foregoing descriptions of the translation model based training method and the application scenario of the translation model obtained through training, the translation method of the translation model obtained through training is described below. Correspondingly, an embodiment of the present disclosure further provides a translation model based translation method, including: obtaining a translation model obtained through training in an adversarial network, the translation model being obtained through training in the adversarial network by using a source sentence as input of the translation model, by using a target sentence as output of the translation model, and by using a similarity between the target sentence and a reference model as a weight coefficient, and the similarity being calculated by using a discriminator model of the adversarial network; inputting a to-be-translated sentence into the translation model obtained through training; calculating a semantic vector corresponding to the to-be-translated sentence by using the translation model obtained through training; and using the semantic vector as input of the translation model obtained through training, and outputting a translation result sentence corresponding to the to-be-translated sentence.

In an embodiment, performance of calculating, by the discriminator model, the similarity is obtained through training in the adversarial network by using the reference sentence and the target sentence as input of the discriminator model, and by using fidelity of the target sentence to the source sentence as output of the discriminator model.

In an embodiment, the calculating a semantic vector corresponding to the to-be-translated sentence by using the translation model obtained through training includes: generating a vector sequence corresponding to the source sentence by using the encoder model of the translation model obtained through training; allocating an attention probability to a word vector in the vector sequence of the source sentence by using an attention model; and performing weighted summation on the word vector in the vector sequence of the source sentence and the allocated attention probability, to obtain the semantic vector corresponding to the source sentence.

In an embodiment, the using the semantic vector as input of the translation model obtained through training, and outputting a translation result sentence corresponding to the to-be-translated sentence includes: using the semantic vector, a state of a decoder model in the translation model obtained through training, and a word outputted by the decoder model last time as input of the translation model obtained through training, and calculating a probability that candidate words are aligned to words in the to-be-translated sentence; selecting a candidate word that meets a probability condition as an outputted word based on the calculated probability; and connecting words outputted corresponding to the words of the to-be-translated sentence, to form the translation result sentence corresponding to the to-be-translated sentence.

Figure 12:
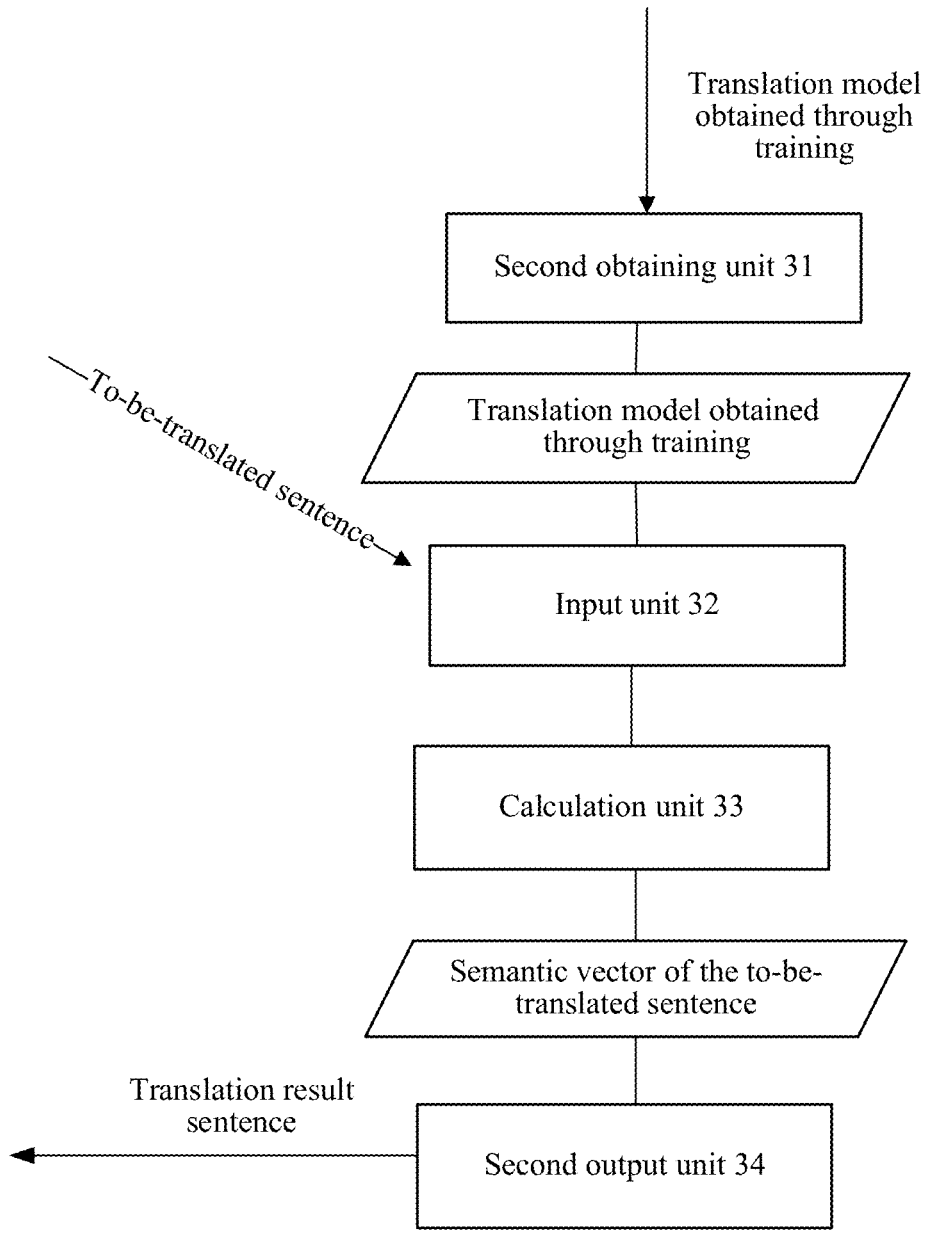
FIG. 12 is a block diagram of a translation model based translation apparatus according to an embodiment of the present disclosure.

Corresponding to the foregoing translation model based translation method, an embodiment of the present disclosure further provides a translation model based translation apparatus. FIG. 12 is a schematic structural diagram of a composition of the translation model based translation apparatus according to one embodiment of the present disclosure. Referring to FIG. 12, the apparatus includes: a second obtaining unit 31, an input unit 32, a calculation unit 33, and a second output unit 34, etc.

The second obtaining unit 31 is configured to obtain a translation model obtained through training in an adversarial network. The translation model is obtained through training in the adversarial network by using a source sentence as input of the translation model, by using a target sentence as output of the translation model, and by using a similarity between the target sentence and a reference model as a weight coefficient, and the similarity being calculated by using a discriminator model of the adversarial network.

The input unit 32 is configured to input a to-be-translated sentence into the translation model obtained through training. The calculation unit 33 is configured to calculate a semantic vector corresponding to the to-be-translated sentence by using the translation model obtained through training. The second output unit 34 is configured to: use the semantic vector as input of the translation model obtained through training, and output a translation result sentence corresponding to the to-be-translated sentence.

In an embodiment, the calculation unit 33 is further configured to: generate a vector sequence corresponding to the source sentence by using the encoder model of the translation model obtained through training; allocate an attention probability to a word vector in the vector sequence of the source sentence by using an attention model; and perform weighted summation on the word vector in the vector sequence of the source sentence and the allocated attention probability, to obtain the semantic vector corresponding to the source sentence.

In an embodiment, the second output unit 34 is further configured to: use the semantic vector, a state of a decoder model in the translation model obtained through training, and a word outputted by the decoder model last time as input of the translation model obtained through training, and calculate a probability that candidate words are aligned to words in the to-be-translated sentence; select a candidate word that meets a probability condition as an outputted word based on the calculated probability; and connect words outputted corresponding to the words of the to-be-translated sentence, to form the translation result sentence corresponding to the to-be-translated sentence.

The translation model based translation apparatus of one embodiment of the present disclosure may be implemented on the computer device shown in FIG. 9. It may be understood that each of the modules included in the translation model based translation apparatus may be completely or partially implemented by using software, hardware, or a combination thereof.

An embodiment of the present disclosure further provides one or more non-transitory readable storage media, the one or more readable storage media storing computer-readable instructions. When executed by one or more processors, the computer-readable instructions are used to implement the followings: inputting a source sentence to a translation model, to obtain a target sentence outputted by the translation model; determining fidelity of the target sentence to the source sentence; using the target sentence and a reference sentence as input of a discriminator model, using the fidelity as output of the discriminator model, and training the discriminator model on the performance of calculating a similarity between the target sentence and the reference sentence; outputting the similarity between the target sentence and the reference sentence by using the discriminator model; and using the source sentence as input of the translation model, using the target sentence as output of the translation model, and using the similarity as a weight coefficient, and training the translation model on the performance of outputting the corresponding target sentence according to the input source sentence.

When executed by the processors, the computer-readable instructions are further used to implement the followings: in response to that the fidelity is a coverage, obtaining a first coverage quantity of words of the target sentence that cover words of the source sentence; and obtaining a second coverage quantity of words of the reference sentence that cover the words of the source sentence; calculating a difference between the first coverage quantity and the second coverage quantity; and calculating a ratio of the difference to the second coverage quantity as the coverage.

When executed by the processors, the computer-readable instructions are further used to implement the followings: aligning a vector of each word in the target sentence to a vector of a corresponding word in the source sentence to form a first alignment matrix in a process of obtaining a vector sequence of the target sentence outputted by the translation model; and collecting, from the first alignment matrix, statistics on the first coverage quantity of the words of the target sentence that cover the words of the source sentence.

When executed by the processors, the computer-readable instructions are further used to implement the followings: separately obtaining vector sequences corresponding to the reference sentence and the source sentence; aligning vectors corresponding to same words in the vector sequence of the source sentence and the vector sequence of the reference sentence, to obtain a second alignment matrix; and collecting, from the second alignment matrix, statistics on the second coverage quantity of the words of the reference sentence that cover the words of the source sentence.

When executed by the processors, the computer-readable instructions are further used to implement the followings: matching words in the target sentence and words in the reference sentence in response to that the fidelity is a bilingual evaluation understudy value, to obtain a quantity of same words in the target sentence and the reference sentence; and calculating a ratio of the obtained quantity to a quantity of the words in the target sentence as the bilingual evaluation understudy value.

When executed by the processors, the computer-readable instructions are further used to implement the followings: encoding the target sentence by using a first neural network model in the discriminator model, to obtain a first encoding vector; encoding the reference sentence by using a second neural network model in the discriminator model, to obtain a second encoding vector; and inputting the first encoding vector and the second encoding vector into a third neural network model in the discriminator model for similarity calculation, to obtain the similarity between the target sentence and the reference sentence.

When executed by the processors, the computer-readable instructions are further used to implement the followings: initializing an input layer, an intermediate layer, and an output layer that are included by the translation model; constructing a training sample set, the training sample set including a to-be-translated source sentence and a target sentence of a translation result corresponding to the source sentence; initializing a loss function established based on the input of the translation model, the output of the translation model, and a translation model parameter; using a source sentence of a selected training sample as input, using a target sentence of the selected training sample as output, and calculating an updated value of the translation model parameter in a dimension that corresponds to the selected training sample when the loss function obtains a minimum value relative to the selected training sample; fusing updated values corresponding to selected training samples based on a similarity between the corresponding samples; and updating the translation model parameter based on an updated value that is obtained through fusion and that is of the translation model parameter corresponding to the training sample set.

When executed by the processors, the computer-readable instructions are further used to implement the followings: calculating a semantic vector corresponding to the source sentence by using an encoder model of the translation model; calculating, based on the semantic vector that is of a decoder model and that is inputted into the translation model, a state of the decoder model when the semantic vector is inputted, and a word outputted by the decoder model last time, a probability that candidate words are aligned to words in the source sentence; selecting a calculated candidate word that has a highest alignment probability as an outputted word; and connecting words outputted corresponding to the words of the source sentence, to form the target sentence.

When executed by the processors, the computer-readable instructions are further used to implement the followings: generating a vector sequence corresponding to the source sentence by using the encoder model of the translation model; allocating an attention probability to a word vector in the vector sequence of the source sentence by using an attention model; and performing weighted summation on the word vector in the vector sequence of the source sentence and the allocated attention probability, to obtain the semantic vector corresponding to the source sentence.

An embodiment of the present disclosure further provides a computer device, including a memory and one or more processors.

The memory is configured to store computer-readable instructions; and the one or more processors are configured to implement the foregoing translation model based translation method when executing the computer-readable instructions stored in the memory.

An embodiment of the present disclosure further provides one or more storage media, storing computer-readable instructions, the computer-readable instructions, when executed by one or more processors, implement the foregoing translation model based translation method.

The foregoing descriptions related to the translation model based training apparatus are similar to those of the foregoing training method, and the descriptions of the beneficial effects of the apparatus are similar to those of the beneficial effects of the method, and details are not described herein again. The descriptions of the translation model based translation apparatus are similar to those of the foregoing translation method, and the descriptions of the beneficial effects of the apparatus are similar to those of the beneficial effects of the method, and details are not described herein again. Refer to the descriptions of the method embodiments of the present disclosure for the technical details that are not disclosed in the embodiments of the translation model based training apparatus, the translation model based translation apparatus, the computer device, and the storage medium in the present disclosure.

Some or all of steps of the embodiments may be implemented by using hardware related to a program instruction. The program may be stored in a computer readable storage medium. When the program is executed, the steps including the method embodiments are performed. However, the storage medium includes various types of media that can store program code, for example, a random access memory (RAM), a read-only memory (ROM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A translation model based training method for a computer device, comprising:
   inputting a source sentence to a translation model, to obtain a target sentence outputted by the translation model;
   determining a fidelity of the target sentence to the source sentence, by:
      in response to that the fidelity is a coverage, obtaining a first coverage quantity of words of the target sentence that cover words of the source sentence;
      obtaining a second coverage quantity of words of a reference sentence that cover the words of the source sentence;
      calculating a difference between the first coverage quantity and the second coverage quantity; and
      calculating a ratio of the difference to the second coverage quantity as the coverage;
   using the target sentence and the reference sentence as input of a discriminator model, using the fidelity as output of the discriminator model, and training the discriminator model on a performance of calculating a similarity between the target sentence and the reference sentence;

outputting the similarity between the target sentence and the reference sentence by using the discriminator model; and using the source sentence as input of the translation model, using the target sentence as output of the translation model, and using the similarity as a weight coefficient, and training the translation model on a performance of outputting the corresponding target sentence according to the input source sentence.

2. The method according to claim 1, wherein the obtaining a first coverage quantity of words of the target sentence that cover words of the source sentence comprises:

aligning a vector of each word in the target sentence to a vector of a corresponding word in the source sentence to form a first alignment matrix in a process of obtaining a vector sequence of the target sentence outputted by the translation model; and collecting, by the computer device from the first alignment matrix, statistics on the first coverage quantity of the words of the target sentence that cover the words of the source sentence.

3. The method according to claim 1, wherein the obtaining a second coverage quantity of words of the reference sentence that cover the words of the source sentence comprises:

separately obtaining vector sequences corresponding to the reference sentence and the source sentence;

aligning vectors corresponding to same words in the vector sequence of the source sentence and the vector sequence of the reference sentence, to obtain a second alignment matrix; and collecting, from the second alignment matrix, statistics on the second coverage quantity of the words of the reference sentence that cover the words of the source sentence.

4. The method according to claim 1, wherein the determining fidelity of the target sentence to the source sentence comprises:

matching words in the target sentence and words in the reference sentence in response to that the fidelity is a bilingual evaluation understudy value, to obtain a quantity of same words in the target sentence and the reference sentence; and calculating a ratio of the obtained quantity to a quantity of the words in the target sentence as the bilingual evaluation understudy value.

5. The method according to claim 1, wherein the outputting the similarity between the target sentence and the reference sentence by using the discriminator model comprises:

encoding the target sentence by using a first neural network model in the discriminator model, to obtain a first encoding vector;

encoding the reference sentence by using a second neural network model in the discriminator model, to obtain a second encoding vector; and inputting the first encoding vector and the second encoding vector into a third neural network model in the discriminator model for similarity calculation, to obtain the similarity between the target sentence and the reference sentence.

6. The method according to claim 1, wherein the using the source sentence as input of the translation model, using the target sentence as output of the translation model, and using the similarity as a weight coefficient, and training the translation model on a performance of outputting the corresponding target sentence according to the input source sentence comprises:

constructing a training sample set;

initializing a loss function established based on the input of the translation model, the output of the translation model, and a translation model parameter; and updating the translation model parameter based on the updated value.

7. The method according to claim 1, wherein the inputting a source sentence to a translation model, to obtain a target sentence outputted by the translation model comprises:

calculating a semantic vector corresponding to the source sentence;

calculating a probability that candidate words are aligned to words in the source sentence;

selecting a calculated candidate word that has a highest alignment probability from the candidate words as an outputted word; and connecting the outputted word to form the target sentence.

8. The method according to claim 7, wherein the calculating a semantic vector corresponding to the source sentence comprises:

generating a vector sequence corresponding to the source sentence;

allocating an attention probability to a word vector in the vector sequence of the source sentence; and performing weighted summation on the word vector in the vector sequence of the source sentence and the allocated attention probability, to obtain the semantic vector corresponding to the source sentence.

9. A computer device, comprising: a memory storing computer-readable instructions; and one or more processors coupled to the memory and, when executing the computer-readable instructions, configured to perform:

inputting a source sentence to a translation model, to obtain a target sentence outputted by the translation model;

determining fidelity of the target sentence to the source sentence, by:

in response to that the fidelity is a coverage, obtaining a first coverage quantity of words of the target sentence that cover words of the source sentence;

obtaining a second coverage quantity of words of a reference sentence that cover the words of the source sentence;

calculating a difference between the first coverage quantity and the second coverage quantity; and calculating a ratio of the difference to the second coverage quantity as the coverage;

using the target sentence and the reference sentence as input of a discriminator model, using the fidelity as output of the discriminator model, and training the discriminator model on a performance of calculating a similarity between the target sentence and the reference sentence;

outputting the similarity between the target sentence and the reference sentence by using the discriminator model; and using the source sentence as input of the translation model, using the target sentence as output of the translation model, and using the similarity as a weight coefficient, and training the translation model on a performance of outputting the corresponding target sentence according to the input source sentence.

10. The computer device according to claim 9, wherein the obtaining a first coverage quantity of words of the target sentence that cover words of the source sentence comprises:

aligning a vector of each word in the target sentence to a vector of a corresponding word in the source sentence to form a first alignment matrix in a process of obtaining a vector sequence of the target sentence outputted by the translation model; and collecting, from the first alignment matrix, statistics on the first coverage quantity of the words of the target sentence that cover the words of the source sentence.

11. The computer device according to claim 9, wherein the obtaining a second coverage quantity of words of the reference sentence that cover the words of the source sentence comprises:

separately obtaining vector sequences corresponding to the reference sentence and the source sentence;

aligning vectors corresponding to same words in the vector sequence of the source sentence and the vector sequence of the reference sentence, to obtain a second alignment matrix; and collecting, from the second alignment matrix, statistics on the second coverage quantity of the words of the reference sentence that cover the words of the source sentence.

12. The computer device according to claim 9, wherein the determining fidelity of the target sentence to the source sentence comprises:

matching words in the target sentence and words in the reference sentence in response to that the fidelity is a bilingual evaluation understudy value, to obtain a quantity of same words in the target sentence and the reference sentence; and calculating a ratio of the obtained quantity to a quantity of the words in the target sentence as the bilingual evaluation understudy value.

13. The computer device according to claim 9, wherein the outputting the similarity between the target sentence and the reference sentence by using the discriminator model comprises:

encoding the target sentence by using a first neural network model in the discriminator model, to obtain a first encoding vector;

encoding the reference sentence by using a second neural network model in the discriminator model, to obtain a second encoding vector; and inputting the first encoding vector and the second encoding vector into a third neural network model in the discriminator model for similarity calculation, to obtain the similarity between the target sentence and the reference sentence.

14. The computer device according to claim 9, wherein the using the source sentence as input of the translation model, using the target sentence as output of the translation model, and using the similarity as a weight coefficient, and training the translation model on a performance of outputting the corresponding target sentence according to the input source sentence comprises:

constructing a training sample set;

initializing a loss function established based on the input of the translation model, the output of the translation model, and a translation model parameter;

calculating an updated value of the translation model parameter; and updating the translation model parameter based on the updated value.

15. The computer device according to claim 9, wherein the inputting a source sentence to a translation model, to obtain a target sentence outputted by the translation model comprises:

calculating a semantic vector corresponding to the source sentence;

calculating a probability that candidate words are aligned to words in the source sentence;

selecting a calculated candidate word that has a highest alignment probability from the candidate words as an outputted word; and connecting the outputted word to form the target sentence.

16. The computer device according to claim 15, wherein the calculating a semantic vector corresponding to the source sentence comprises:

generating a vector sequence corresponding to the source sentence;

allocating an attention probability to a word vector in the vector sequence of the source sentence; and performing weighted summation on the word vector in the vector sequence of the source sentence and the allocated attention probability, to obtain the semantic vector corresponding to the source sentence.

17. A non-transitory computer-readable storage medium storing computer program instructions executable by at least one processor to perform:

inputting a source sentence to a translation model, to obtain a target sentence outputted by the translation model;

determining a fidelity of the target sentence to the source sentence, by:

in response to that the fidelity is a coverage, obtaining a first coverage quantity of words of the target sentence that cover words of the source sentence;

obtaining a second coverage quantity of words of a reference sentence that cover the words of the source sentence;

calculating a difference between the first coverage quantity and the second coverage quantity; and calculating a ratio of the difference to the second coverage quantity as the coverage;

using the target sentence and the reference sentence as input of a discriminator model, using the fidelity as output of the discriminator model, and training the discriminator model on a performance of calculating a similarity between the target sentence and the reference sentence;

outputting the similarity between the target sentence and the reference sentence by using the discriminator model; and using the source sentence as input of the translation model, using the target sentence as output of the translation model, and using the similarity as a weight coefficient, and training the translation model on a performance of outputting the corresponding target sentence according to the input source sentence.

* * * * *